(12) United States Patent
Jagarlapudi et al.

(10) Patent No.: US 12,726,466 B2
(45) Date of Patent: Sep. 1, 2026

(54) SOURCE-BASED CAPTURE OF CLEAR TEXT FROM ENCRYPTED DATA TRAFFIC FOR NETWORK TRAFFIC VISIBILITY PROCESSING

(71) Applicant: Gigamon Inc., Santa Clara, CA (US)

(72) Inventors: Raghava Krishna Jagarlapudi, Santa Clara, CA (US); Naveed Cochinwala, San Jose, CA (US); Yan Xiu, San Ramon, CA (US)

(73) Assignee: Gigamon Inc., Santa Clara, CA (US)

( * ) Notice: Subject to any disclaimer, the term of this patent is extended or adjusted under 35 U.S.C. 154(b) by 41 days.

(21) Appl. No.: 18/364,198

(22) Filed: Aug. 2, 2023

(65) Prior Publication Data

US 2025/0047650 A1 Feb. 6, 2025

(51) Int. Cl.
*H04L 9/40* (2022.01)
*H04L 69/22* (2022.01)

(52) U.S. Cl.
CPC ........ *H04L 63/0485* (2013.01); *H04L 63/166* (2013.01); *H04L 69/22* (2013.01)

(58) Field of Classification Search
CPC .... H04L 63/0485; H04L 63/166; H04L 69/22
USPC .......................................... 713/151; 703/151
See application file for complete search history.

(56) References Cited

U.S. PATENT DOCUMENTS 10,277,562 B1 * 4/2019 Frederick ............ H04L 63/0272
12,537,683 B2 * 1/2026 Bommana ................ H04L 9/32
2004/0225885 A1 * 11/2004 Grohoski ............ H04L 63/0485 712/E9.067
2005/0213603 A1 * 9/2005 Karighattam ........... H04L 49/90 370/466
2009/0178061 A1 * 7/2009 Sandoval ................ H04L 67/02 719/328
2016/0105469 A1 * 4/2016 Galloway ............... H04L 69/16 709/231
2019/0044889 A1 * 2/2019 Serres ................... H04L 47/365
2020/0067700 A1 * 2/2020 Bergeron .............. H04L 41/046

(Continued)

FOREIGN PATENT DOCUMENTS

CN 116346422 A 6/2023
CN 116506189 A 7/2023
WO 2018233379 A1 12/2018

OTHER PUBLICATIONS

Combined Search Report and Examination report for Application No. GB2408931.0 dated Oct. 22, 2024 (p. 08).

*Primary Examiner* — Tan Doan
(74) *Attorney, Agent, or Firm* — Van Hoven PC; Jordan Becker

(57) ABSTRACT

A method of providing clear text representing encrypted data to an entity that does not support an encryption/decryption protocol used to encrypt/decrypt the data is disclosed. A call to an encryption/decryption function implemented in a worker node is detected, wherein the call is to trigger encryption or decryption of a packet. In response to detecting the call, a clear text payload of the packet is captured from an entry point or an exit point of the encryption/decryption function. A modified packet is then created based on the captured clear text payload, including synthesizing a plurality of headers for the modified packet and appending the plurality of headers to the clear text payload. The modified packet is then sent to a processing entity that is external to the worker node.

23 Claims, 10 Drawing Sheets

(56) References Cited

U.S. PATENT DOCUMENTS

| | | | | |
|---|---|---|---|---|
| 2022/0103525 | A1* | 3/2022 | Shribman | ........... G06F 16/9566 |
| 2023/0136524 | A1 | 5/2023 | Borello et al. | |

* cited by examiner

300
Deployment
301
Replica Set V1
Replica Set V2
Replica Set V3
302
Pod
303
Node

SOURCE-BASED CAPTURE OF CLEAR TEXT FROM ENCRYPTED DATA TRAFFIC FOR NETWORK TRAFFIC VISIBILITY PROCESSING

TECHNICAL FIELD

At least one embodiment of the present disclosure pertains to techniques for providing visibility into network data traffic, and more particularly, to a technique for providing clear text representing encrypted data to an entity that expects data to be in clear text for further analysis.

BACKGROUND

Network communications traffic may be acquired at numerous entry points on a network by one or more devices called network traffic "visibility nodes" to provide extensive visibility of communications traffic flow and network security. These network traffic visibility nodes (or simply "visibility nodes" herein) may include physical devices, virtual devices, and Software Defined Networking (SDN)/Network Function Virtualization (NFV) environments, and may be collectively referred to as the computer network's "visibility fabric." Various kinds of network tools are commonly coupled to such visibility nodes and used to identify, analyze, and/or handle security threats to the computer network, bottlenecks in the computer network, etc. Examples of such tools include an intrusion detection system (IDS), an intrusion prevention system (IPS), a network monitoring system, and an application monitoring system. The network visibility nodes are typically used to route network traffic (e.g., packets) to and from one or more connected network tools for these purposes. Examples of network visibility nodes suitable for these purposes include any of the GigaVUE® series of visibility appliances available from Gigamon® Inc. of Santa Clara, California. A network visibility node can be a physical device or system, or it can be a virtual device that is hosted by a physical device or system. A network visibility node commonly applies one or more policies to acquire and monitor traffic communicated in the target network.

Encryption is often used to protect sensitive data communicated on computer networks. For example, encryption applications may encrypt data sent between servers and clients. However, the use of encryption may limit the capabilities of security tools that require data in clear text.

BRIEF DESCRIPTION OF THE DRAWINGS

Various features of the technology will become apparent to those skilled in the art from a study of the Detailed Description in conjunction with the drawings. Embodiments of the technology are illustrated by way of example and not limitation in the drawings, in which like references may indicate similar elements.

DETAILED DESCRIPTION

Figure 1A:
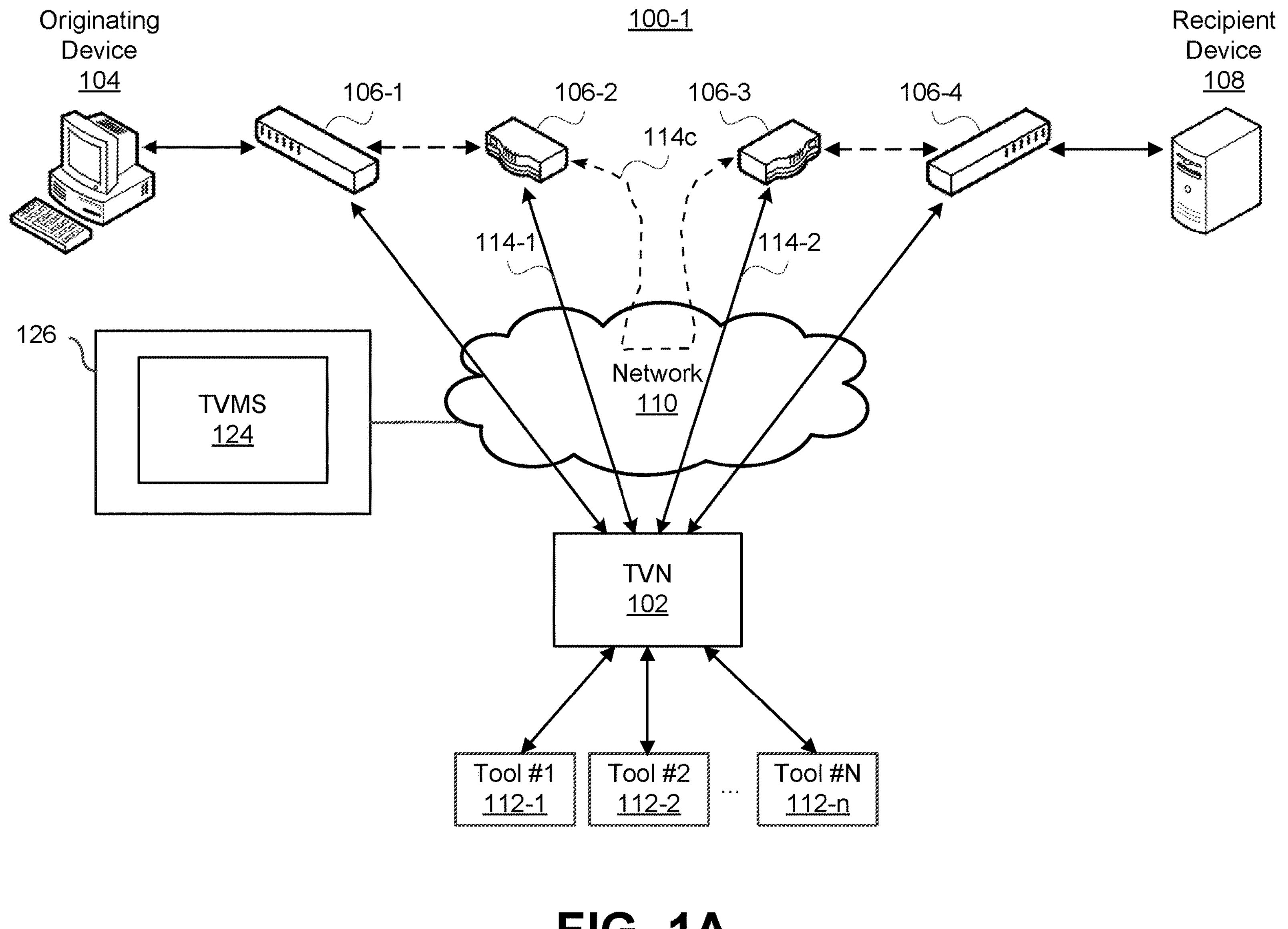
FIG. 1A depicts an example of a network arrangement in which a network visibility node receives data packets from nodes in a computer network.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Encryption techniques and protocols, such as secure sockets layer (SSL) for example, may be used to protect sensitive data communicated on computer networks. For example, encryption applications may encrypt data sent between servers and clients. However, the use of encryption may limit the capabilities of a traffic visibility fabric, security tools and/or other devices that require data in clear text. One possible solution is to use a keys-based approach, where SSL/TLS keys need to be captured and used to decrypt the traffic. A device needs to have the appropriate keys to decrypt the encrypted traffic. But providing and managing keys are a significant challenge in such a solution. That approach uses software to keep track of which session keys should be applied to which packets for decryption, which significantly increases processing overhead. In addition, that approach can complicate session renegotiation.

Introduced here, therefore, is a technique for providing clear text representing monitored data that is encrypted or about to be encrypted, from a worker node to another entity, such as a traffic visibility node (TVN) or a tool connected to a TVN, which expects to receive the data as clear text. The technique avoids the need for resource intensive key management for purposes of providing visibility for encrypted network traffic. To facilitate description, this technique is referred to herein as encryption-compatible visibility (ECV). The term "encryption/decryption" as used herein means either encryption or decryption, whichever is applicable depending on the context.

The ECV technique in at least some embodiments involves placing software hooks at the entry and/or exit points of library-based encryption/decryption functions in each of one or more worker nodes. The software hooks enable detection of library calls to local encryption/decryption functions and further enable local capture of clear text payloads of encrypted packets or packets that are to be encrypted. The worker nodes can be, but are not necessarily, worker nodes in a containerized environment, such as a Kubernetes environment, as described further below.

Placing software hooks at the entry and/or exit points of the local encryption/decryption functions to enable capture of clear text packet data eliminates the need for complex key management for purposes of providing traffic visibility functions. This technique, therefore, significantly reduces processing overhead associated with providing traffic visibility in a system that uses encryption. Furthermore, it does so without the need for a separate proxy application.

In at least some embodiments, the ECV technique is implemented, at least in part, by providing a separate ECV host associated with, and local to, each worker node to which ECV is to be applied. Using a software hook, the ECV host detects a call to an encryption/decryption function implemented in its associated worker node. The call can be a call to an encryption function in the worker node, for triggering encryption of a packet generated by a workload application in the worker node, for transmission to another node. Alternatively, the call can be a call to a decryption function in the worker node, for triggering decryption of an encrypted packet received by the worker node and destined for the workload application. The encryption/decryption function can be, for example, an SSL_Read function or an SSL_Write function in a secure sockets layer (SSL) library, such as an OpenSSL library. The workload application can be, for example, a transport layer security (TLS) application.

In response to detecting the call, the ECV host captures, via the same or another software hook, a clear text payload of the packet from an entry or exit point of the encryption/decryption function, whichever is applicable. The ECV host then creates a modified packet based on the captured clear text payload of the packet. Creating the modified packet includes synthesizing one or more headers for the modified packet, such as L2, L3 and L4 headers, and appending the headers to the clear text payload. The ECV host then sends the modified packet to one or more other processing entities external to the worker node, such as one or more TVNs and/or a network visibility tools. The modified packet may be sent by the ECV host securely to the other processing entity or entities via a tunneling protocol, for example, which may (but does not necessarily) implement a secure tunnel.

A human user (e.g., a visibility fabric administrator) can select the services to which ECV is to be applied, via a separate traffic visibility management system (TVMS). The TVMS provides a suitable user interface to allow the user to configure and supervise various traffic visibility operations. The TVMS also ascertains which workload application(s) in the monitored environment provide the selected services and which worker node(s) implement those workload applications, and then provides an indication of the relevant workload applications to the ECV host associated with each of those worker nodes.

The ECV host or hosts that receive this indication from the TVMS use that indication to identify the encryption/decryption library or libraries used by their relevant workload applications, and in response, they place software hooks on those encryption/decryption functions. The user may also be enabled to specify whether ECV is to be applied to: 1) encrypted packets that are to be decrypted (e.g., encrypted packets received by a worker node from another worker node), 2) unencrypted packets that are to be encrypted (e.g., packets generated by a workload application in the worker node), or both. These selections are also signaled by the TVMS to the appropriate ECV host or hosts, to enable the appropriate ECV host or other entity to place the software hooks at the appropriate points in the relevant encryption/decryption library or libraries.

The ECV technique can handle multiple simultaneous connections. Hence, the ECV host can, for each of a multiple packets associated with a multiple connections, identify contextual metadata for the packet, use the contextual metadata to identify a connection with which the packet is associated, and include additional metadata in at least one of the synthesized headers to indicate the connection with which the packet is associated. The contextual metadata may include, for example, a packet sequence number, and five-tuple details (i.e., source IP address, destination IP address, source port number, destination port number, and protocol).

Additionally, because the ECV host has access to both the encrypted complete packets and the corresponding clear text packet payloads, and contextual metadata relating to those, the ECV host can be configured to correlate the captured clear text payload with its corresponding encrypted full packet data and send all the correlated data to the TVN and/or other processing entities.

The ECV host can also use contextual metadata to translate cluster-internal IP addresses (i.e., IP addresses that are only relevant within the cluster) into global IP addresses understood by the TVN, tools and/or other processing entities that are external to the cluster. Additional details of the ECV technique will be apparent from the description that follows.

General System Overview

In some embodiments, the ECV technique may be implemented in a containerized environment. Containerization is a form of virtualization in which the components of an application are bundled into a single container image and can be run in isolated user space on the same shared operating system. Containerization is increasingly being used to deploy software in cloud environments. Advantages of containerization are that it provides portability, scalability, fault tolerance and agility. An example of a popular system for providing containerization is the open source Kubernetes container orchestration system for automating software deployment, scaling, and management.

Before further considering the ECV technique in a containerized environment, it is useful first to consider how traffic visibility can be employed in a non-containerized environment. FIG. 1A shows an example of a non-containerized network arrangement 100-1 in which a network traffic visibility node (TVN) 102 receives data packets from multiple devices and/or applications (collectively referred to as "nodes") in a computer network 110. The nodes (e.g., switches 106-1, 106-4 and routers 106-2, 106-3) couple an originating device 104 (e.g., desktop computer system operating as a client) to a destination device 108 (e.g., server) and allow data packets to be transmitted between the originating device 104 and the destination device 108. Examples of nodes include switches, routers, and network taps.

Each node represents an entry point into the computer network 110. The entry points, however, could be, and often are, from different points within the computer network 110. Generally, at least some of the nodes are operable to transmit data packets received as network traffic (or duplicate copies of the data packets) to a TVN 102 for analysis. Thus, network traffic is directed to TVN 102 by a node that provides an entry point into the computer network 110.

Whether a node transmits the original data packets or copies of the data packets to a device downstream of the node (e.g., the TVN 102) depends on whether the downstream device is an inline device or an out-of-band or "tapped mode" device (i.e., where a copy of each packet is provided to the TVN 102 by a network tap. As noted above, inline devices receive the original data packets, while out-of-band devices receive copies of original data packets.

Here, for example, the TVN 102 can receive original data packets from node 106-2 (e.g., via transmission path 114-1) and pass at least some of the original data packets to node 106-3 (e.g., via transmission path 114-2). Because node 106-2 is able to transmit network traffic downstream through the TVN 102, node 106-2 need not be coupled directly to node 106-3 (i.e., transmission path 114*c* may not exist). Some or all of the nodes within the computer network can be configured in a similar fashion.

When the TVN 102 is deployed as an inline device, data packets are received by the network device at a physical network port of the network device. For example, data packets transmitted by node 106-2 via transmission path 114-1 are received by the TVN 102 at a particular network port. The network device may include multiple network ports coupled to different nodes in the computer network 110. The TVN 102 can be, for example, a physical monitoring platform that includes a chassis and interchangeable blades offering various functionalities, such as enhanced packet distribution and masking/filtering capabilities. Alternatively, TVN 102 can be implemented as a virtualized device that is hosted on a physical platform.

The TVN 102 can also include multiple physical tool ports coupled to different network tools 112-1 through 112-*n*. The TVN 102 and tools 112-1 through 112-*n* form at least a portion of a traffic visibility fabric. As further described below, each network tool 112-1 through 112-*n* can be deployed as an inline device or an out-of-band device at any given point in time. An administrator of the traffic visibility fabric may be able to switch the deployment mode of one or more of the network tools 112-1 through 112-*n*. That is, the administrator may be able to deploy an out-of-band network tool as an inline device and vice versa. When a network tool is deployed as an out-of-band device, the TVN 102 creates a duplicate copy of at least some of the data packets received by the TVN 102, and then passes the duplicate copies to a tool port for transmission downstream to the out-of-band network tool. When a network tool is deployed as an inline device, the network device passes at least some of the original data packets to a tool port for transmission downstream to the inline network tool, and those packets are then normally subsequently received back from the tool at a separate tool port of the network device, assuming the packets are not blocked by the tool.

Figure 1B:
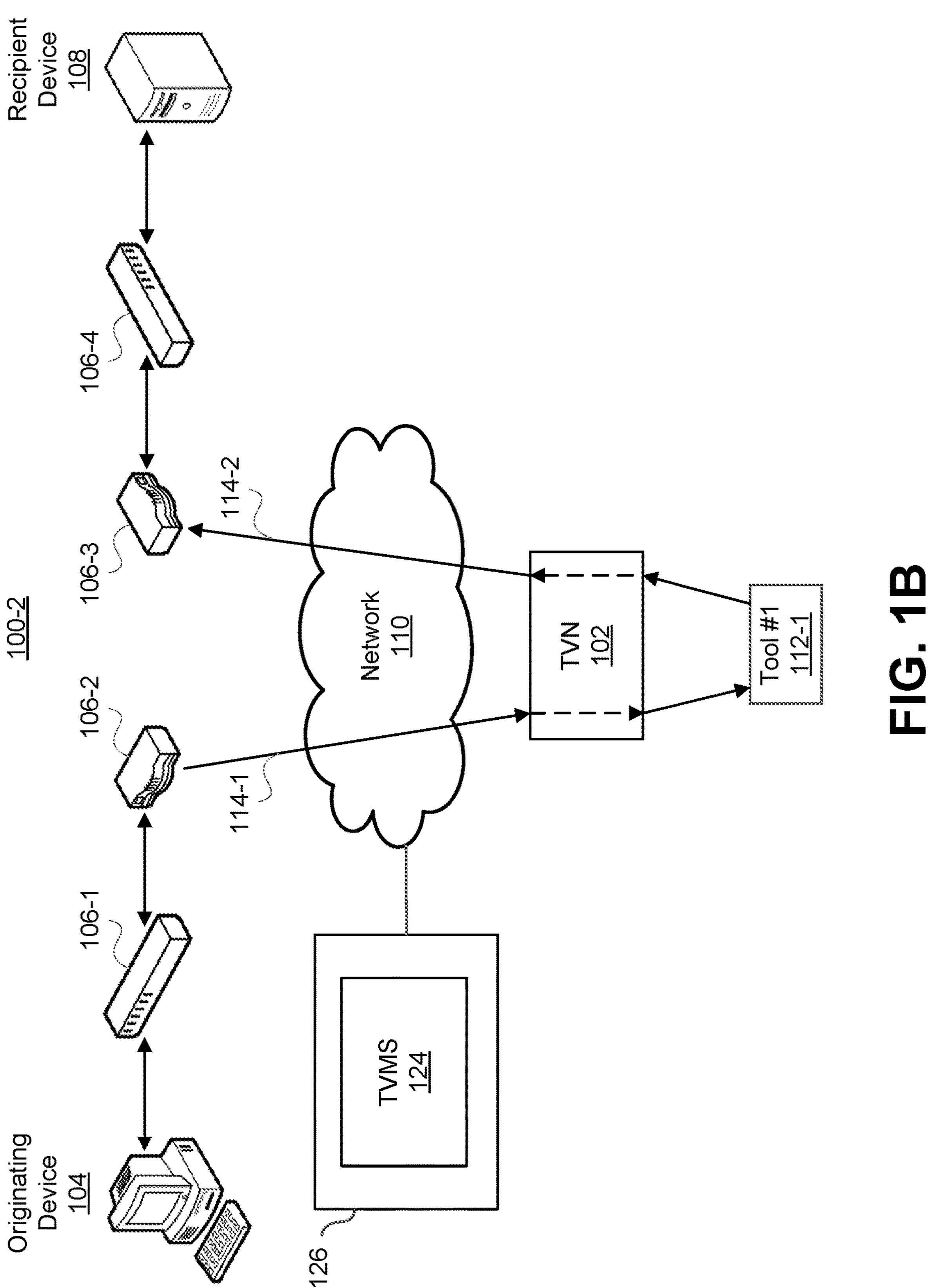
FIG. 1B depicts another example of a network arrangement in which a network visibility node receives data packets from a node in a computer network.

FIG. 1B illustrates an example path of a data packet as the data packet travels from an originating device 104 to a destination device 108. More specifically, FIG. 1B depicts a network arrangement 100-2 in which the TVN 102 and a network tool 112-1 are both deployed as inline devices (i.e., within the flow of network traffic).

Upon receiving a data packet from node 106-2, the TVN 102 identifies a flow map corresponding to the data packet based on one or more characteristics of the data packet. For example, the characteristic(s) could include the communication protocol of which the data packet is a part (e.g., HTTP, TCP, IP) or a session feature (e.g., a timestamp). Additionally or alternatively, the appropriate flow map could be identified based on the network port (of the network device) on which the data packet was received, or the source node from which the data packet was received.

A flow map represents a policy for how the data packet is to be handled by the TVN 102. For example, the flow map could indicate that the data packet is to be aggregated with another data packet, filtered, sampled, modified (e.g., stripped of a header or payload), or forwarded to one or more tool ports. Moreover, the flow map could specify that the data packet is to be transmitted in a one-to-one configuration (i.e., from a network port of the TVN 102 to a tool port of the TVN 102) or one-to-many configuration (i.e., from a network port of the TVN 102 to multiple tool ports of the TVN 102). Similarly, a single tool port of the TVN 102 could receive data packets from one or more network ports of the TVN 102.

Often the data packet is passed by the TVN 102 to a tool port of the TVN 102 for transmission downstream to a network tool (e.g., a monitoring and/or security-related tool). Here, for example, the flow map may specify that the data packet is to be passed by the TVN 102 to a tool port for transmission downstream to tool 112-1. The network device may aggregate or modify the data packet in accordance with the policy specified by the flow map before passing the data packet to a tool port for transmission downstream to the network tool 112-1. In some embodiments, the TVN 102 includes multiple tool ports, each of which is coupled to a different network tool.

After analyzing the data packet, the tool 112-1 may transmit the data packet back to the TVN 102 (i.e., assuming the tool 112-1 does not determine that the packet should be blocked), which passes the data packet to a network port for transmission downstream to another node (e.g., node 106-3).

FIGS. 1A and 1B also show how a TVN 102 can be connected via a network 110 (e.g., a local area network (LAN) or the Internet) to a traffic visibility management system (TVMS) 124 running on a separate computer system 126. The TVMS 124 provides a user interface that may be used by a user (e.g., a visibility fabric administrator) to configure the traffic visibility fabric (e.g., TVN 102), including creating and editing traffic monitoring policies. The TVMS 124 also generates traffic visibility summary and statistical reports and outputs them to the user.

Figure 2:
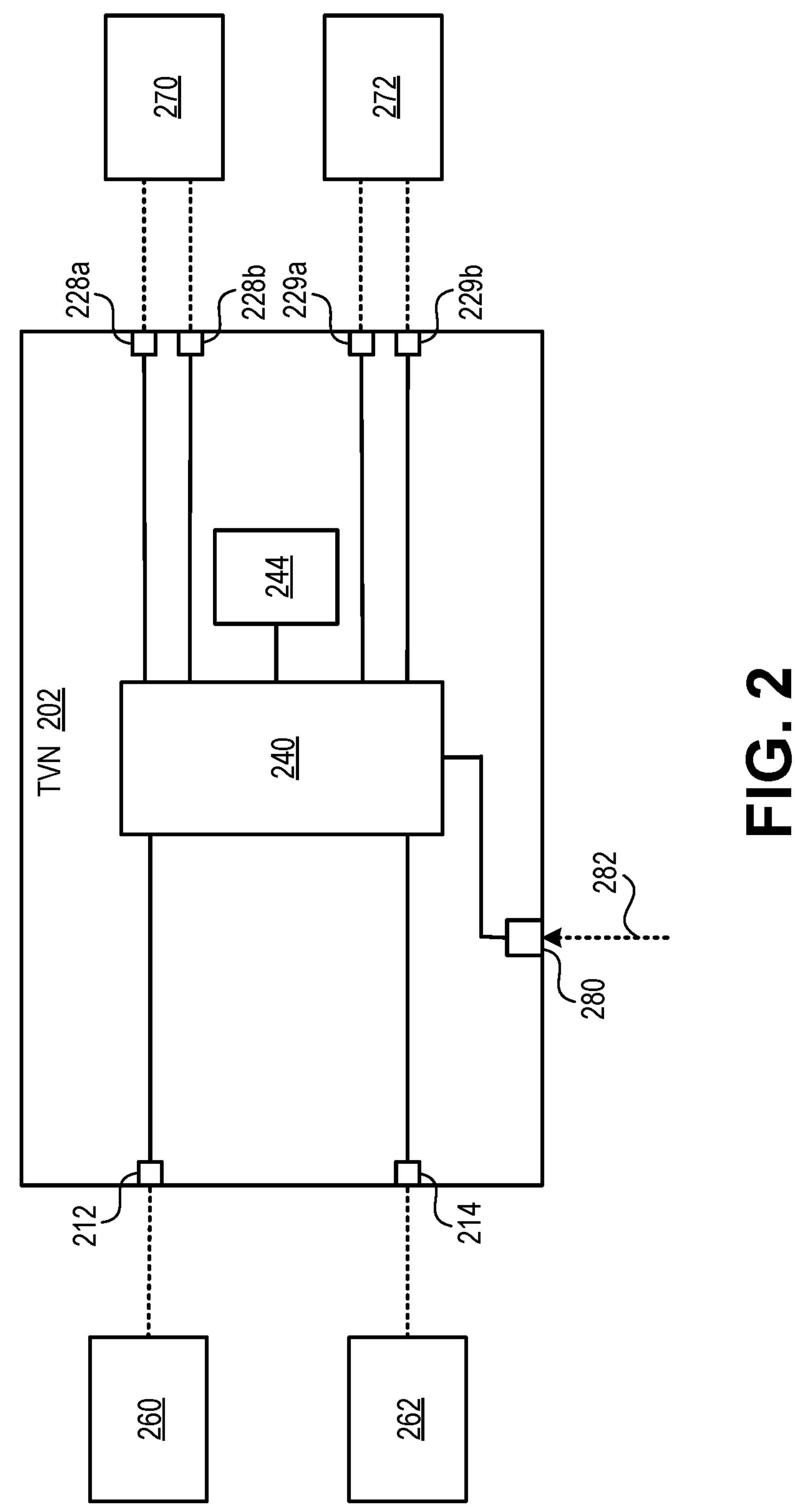
FIG. 2 is a block diagram showing an example of a network visibility node.

FIG. 2 is a block diagram showing an example of a TVN 202 that can be used as part of a traffic visibility fabric in either a containerized environment or (as shown in FIGS. 1A and 1B) in a non-containerized environment. TVN 202 can be representative of TVN 102 in FIGS. 1A and 1B. The example TVN 202 includes two network ports 212 and 214, a first pair of tool ports including an egress tool port 228*a* and an ingress tool port 228*b*, and a second pair of tool ports including an egress port 229*a* and an ingress port 229*b*. Although only two network ports 212, 214 are shown in FIG. 2, in other embodiments the TVN 202 may include more than two network ports. Also, although two tool ports 228, 229 are shown, in other embodiments, the TVN 202 may include only one tool port, or more than two tool ports.

Packets received by the TVN 202 are sent through tool egress port 228*a* to tool 270, which after processing those packets returns them to the TVN 202 through tool ingress port 228*b*. Similarly, packets received by the TVN 202 are sent through tool egress port 229*a* to tool 272, which after processing those packets returns them to the TVN 202 through tool ingress port 229*b*. In other embodiments the TVN 202 may contain more or fewer tool ports than four, and in operation, it may be coupled to more or fewer tools than two.

The TVN 202 also includes a packet switch ("switch module") 240 that implements selective coupling between network ports 212, 214 and tool ports 228, 229. As used in this specification, the term "tool port" refers to any port that is configured to transmit packets to or receive packets from an external tool. The TVN 202 further includes a processor 244, and may include a housing for containing the packet switch 240 and the processor 244. In other embodiments the TVN 202 may not have its own housing and may be implemented as a virtualized device. The processor 244 may be, for example, a general-purpose programmable microprocessor (which may include multiple cores), an application specific integrated circuit (ASIC) processor, a field programmable gate array (FPGA), or other convenient type of circuitry.

The TVN 202 may also include other components not shown, such as one or more network physical layers ("PHYs") coupled to each of the respective ports 212, 214, wherein the network PHYs may be parts of the packet switch 240. Alternatively, the network PHYs may be components that are separate from the packet switch 240. The PHY is configured to connect a link layer device to a physical medium such as an optical fiber, copper cable, etc. In other embodiments, instead of the PHY, the TVN 202 may include an optical transceiver, or a Serializer/Deserializer (SerDes), etc.

During operation of the TVN 202, the first network port 212 of the TVN 202 is communicatively coupled (e.g., via a network, such as a LAN or the Internet) to a first node 260, and the second network port 214 is communicatively coupled (e.g., via a network, such as a LAN or the Internet) to a second node 262. The TVN 202 is configured to communicate packets between the first and second nodes 260, 262 via the network ports 212, 214. Also, during operation, the tool ports 228, 229 of the TVN 202 are communicatively coupled to respective tools 270, 272. The tools 270, 272 may include, for example, one or more of an IDS, IPS, packet sniffer, monitoring system, etc. The tools 270, 272 may be directly coupled to the TVN 202, or communicatively coupled to the TVN 202 through the network (e.g., the Internet). In some cases, the TVN 202 is a single unit that can be deployed at a single point along a communication path.

In the illustrated embodiments, the packet switch 240 is configured to receive packets from nodes 260, 262 via the network ports 212, 214, and process the packets in accordance with a predefined scheme. For example, the packet switch 240 may pass packets received from one or more nodes to one or more tools 270, 272 that are connected to respective tool port(s) 228, 229, respectively.

The packet switch 240 may be any type of switch module that provides packet transmission in accordance with a predetermined transmission scheme (e.g., a policy). In some embodiments, the packet switch 240 may be user-configurable such that packets may be transmitted in a one-to-one configuration (i.e., from one network port to an tool port). Each of tool 270 and tool 272 may be an out-of-band device (i.e., it can only receive packets intended to be communicated between two nodes, and cannot transmit such packets downstream), such as a sniffer, a network monitoring system, an application monitoring system, an IDS, a forensic storage system, an application security system, etc. Alternatively, each of tool 270 and tool 272 may be an in-line device (i.e., it can receive packets, and transmit the packets back to the TVN 202 after the packets have been processed), such as an IPS. In other embodiments, the packet switch 240 may be configured such that the packets may be transmitted in a one-to-many configuration (i.e., from one network port to multiple tool ports). In other embodiments, the packet switch 240 may be configured such that the packets may be transmitted in a many-to-many configuration (i.e., from multiple network ports to multiple tool ports). In further embodiments, the packet switch 240 may be configured such that the packets may be transmitted in a many-to-one configuration (i.e., from multiple network ports to one tool port). In some embodiments, the one-to-one, one-to-many, many-to-many, and many-to-one configurations are all available for allowing a user to selectively configure the TVN 202 so that received packets (or certain types of received packets) are routed according to any of these configurations. In some embodiments, the packet movement configuration is predetermined such that when the TVN 202 receives the packets, the TVN 202 will automatically forward the packets to the ports based on the predetermined packet movement configuration (e.g., one-to-one, one-to-many, many-to-many, and many-to-one) without the need to analyze the packets (e.g., without the need to examine the header, determine the type of packets, etc.).

Examples of a TVN that may implement features and functions described herein include any of the GigaVUE® series of network visibility appliances available from Gigamon® Inc. of Santa Clara, California. An example of a virtualized TVN for a cloud environment is a GigaVUE V Series device from Gigamon Inc.

Containerized Environment

In a containerized environment, each container includes software code that provides one or more services. In a Kubernetes deployment, for example, each container is included in a "pod," and each pod can include multiple containers. Each pod is included within a worker node, and there may be multiple worker nodes in a given containerized deployment. Further, each worker node can contain multiple pods.

Figures 3, 4:
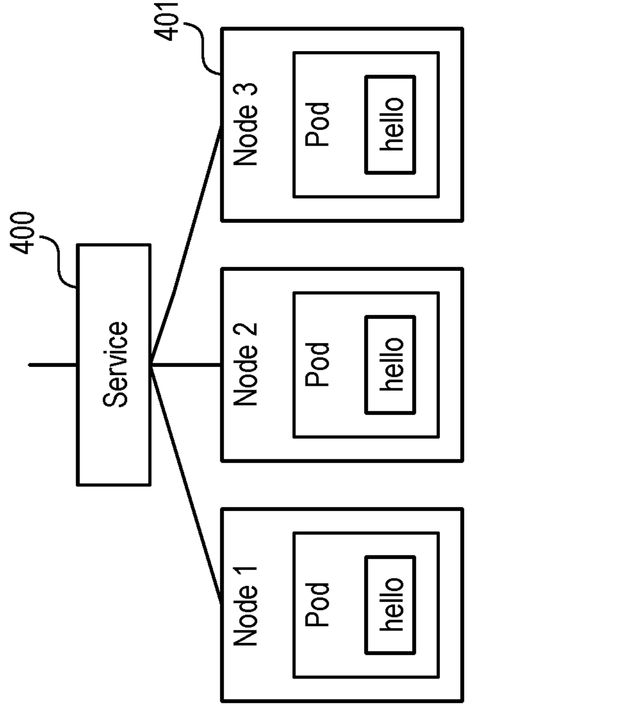
FIG. 3 shows an example of a Kubernetes deployment.
FIG. 4 shows an example of the relationship between services, nodes and pods in a Kubernetes deployment.

FIG. 3 shows an example of a Kubernetes deployment. A given containerized deployment 300 may include multiple replica sets, i.e., multiple instances of a given type of pod as shown. Each replica set 301 can correspond to, for example, a different version (e.g., V1, V2, V3) of a software program, and can include multiple pods, where each pod 302 is included within a particular one of multiple nodes 303 in the deployment 300. FIG. 4 shows an example of the relationship between services, nodes and pods in a Kubernetes deployment. As shown, a particular service (named "hello") can be made available by running it as various Pods across multiple nodes, such as Node1, Node2 and Node3.

Figure 5:
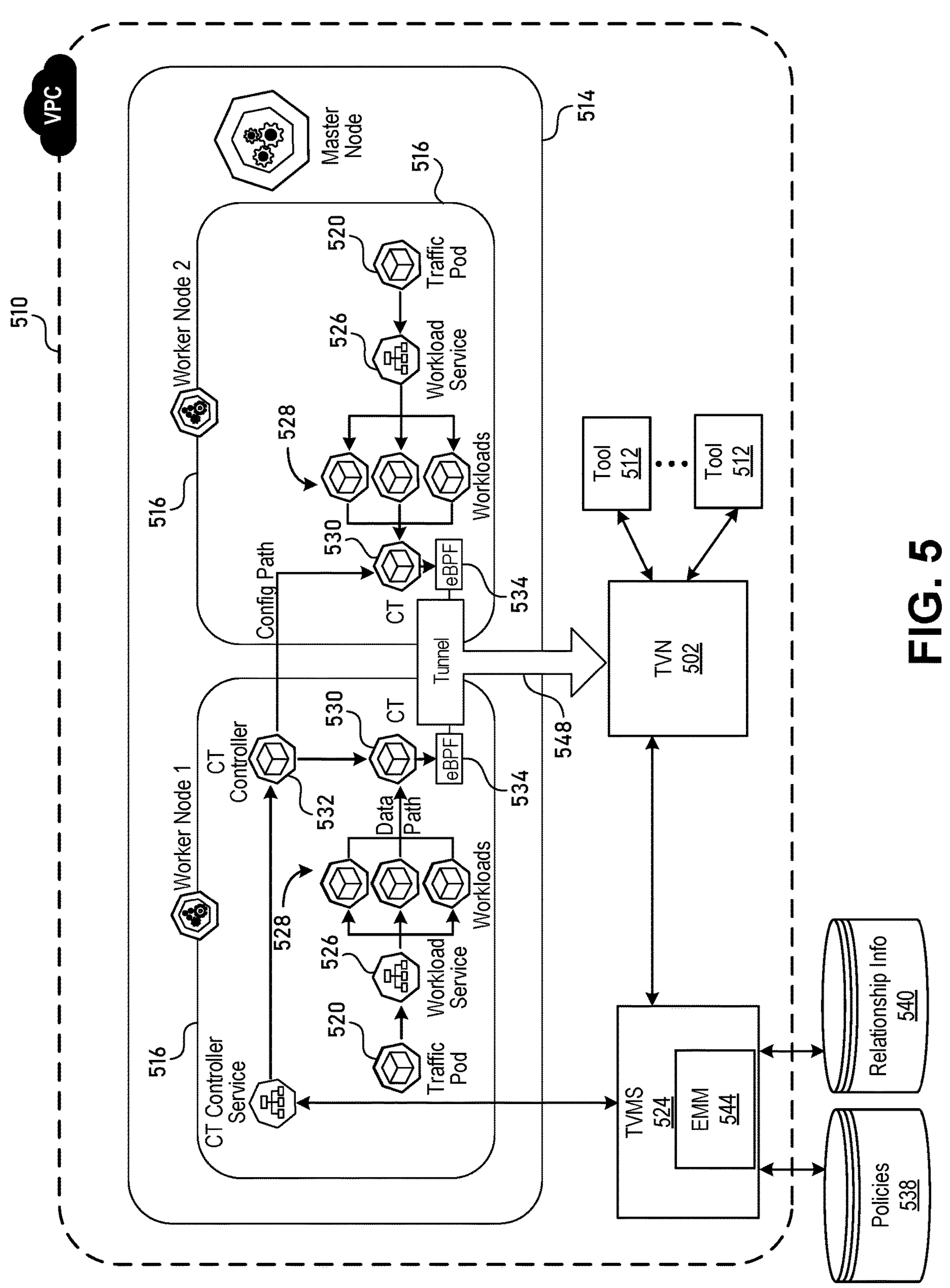
FIG. 5 illustrates an example of a containerized environment in which the dynamic adaptation of traffic monitoring policies can be performed.

FIG. 5 illustrates an example of a containerized environment in which the technique introduced here can be implemented. In at least one embodiment the technique, a traffic visibility fabric is integrated with the containerized environment, although in other embodiments that may not be the case. The traffic visibility fabric includes a TVMS 524, at least one TVN 502 and one or more tools 512 coupled to the TVN 502 in the manner described above. The TVN 502 may be a virtualized device. An example of a virtualized TVN that may be used in this environment is a GigaVUE V Series device from Gigamon Inc. Although only one TVN 502 is shown in FIG. 5, in some embodiments multiple TVNs 502 may be provided in a traffic visibility fabric, such as for load-balancing of traffic input to the visibility fabric.

To facilitate discussion, it is henceforth generally assumed herein that the containerized environment is a Kubernetes environment. However, it should be understood that the technique introduced here can be applied to, or can be easily modified to apply to, other types of containerized environments. Hence, the illustrated environment can be implemented in a virtual private cloud (VPC) 510. The environment includes a master node 514 and two or more worker nodes 516. Each worker node 516 includes at least one traffic pod 520 that generates data traffic in providing one or more workload services 526, which each generate one or more workloads 528.

Any particular worker node 516 may include a different type or types of traffic pod 520 than any other particular worker node, and therefore may provide different types of workload services 526 from any other worker node. Conversely, any particular type of traffic pod 520 may also be replicated across two or more of the worker nodes 516, such that two or more worker nodes 516 may provide the same or overlapping workload services 526.

The traffic visibility fabric in FIG. 5 also includes a containerized tap (CT) 530 within each worker node 516 that is to be monitored for traffic visibility. A CT 530 is a containerized utility component that automatically deploys as a pod within each worker node in the containerized environment, and sends traffic to one or more TVNs 502. A CT 530, in at least some embodiments, can perform traffic acquisition, aggregation, basic filtering, replication, and tunneling support. In other words, a CT 530 is a container or pod, within or associated with a given worker node 516, that actually implements the traffic monitoring polices deployed by the TVMS 524 for that worker node.

In the illustrated embodiment, at least one of the worker nodes 516 also includes a CT controller 532. Each CT 530 is registered with the TVMS 524 through the CT controller 532. The TVMS 524 deploys traffic monitoring policies and configuration data onto each CT 530 via the CT controller 532. The CT controller 532 collects statistics on filtered network traffic from each CT 530 and sends the collected statistics and heartbeats to the TVMS 524. Additionally, the CT controller 532 performs environment inventory collection, and provides the information collected from this process to the TVMS 524.

Data traffic filtered (tapped) by a CT 530 is sent via a tunnel 548 (e.g., a L2GRE or VxLAN tunnel) to the appropriate TVN 502. In at least some embodiments, as illustrated, an extended Berkeley packet filter (eBPF) hook 534 is installed in each worker node 516 and is used by its local CT 530 to implement the tunnel 548 between the CT 530 and the TVN 502. The CT 530 configures a data path in kernel space using the eBPF 534. The workloads 528 collect the network traffic and send the network packets to the kernel space. The kernel space filters (taps) the packets based on the policy rules and filters. The filtered (tapped) network packets can be tunneled directly to the specified tool(s) 512, or they can be sent to the specified tool(s) 512 through the specified TVN(s) 502. The TVN(s) 502 in this embodiment may be one or more virtualized devices running in the cloud environment.

The TVMS 524 may maintain various traffic monitoring policies 538 that include, for example, rules for traffic tapping and filtering, and for tunneling tapped data traffic to the TVN 502. Additionally, the TVMS 524 may maintain detailed relationship information 540 about the physical and logical configuration of the containerized environment, and any changes that occur to the containerized environment, such as information on all nodes, namespaces, services, deployments, pod names, container identifiers (IDs), Internet protocol (IP) addresses and labels used in the environment. In at least some embodiments, the TVMS 524 stores this relationship information 540 in in-memory data structures, which are designed so that once they are populated, the relationships between various resources in the environment can be easily ascertained by the TVMS 524 from the data structures. For example, a service may front-end a set of pods, as illustrated in FIG. 4. Similarly, a deployment may have a set of replicas, i.e., multiple instances of a given type of pod.

Traffic monitoring policies 538 can be defined by a user (e.g., a visibility fabric administrator) through a user interface of the TVMS 524. For example, in addition to traffic source selection, a user can specify rules specifying direction of traffic (e.g., ingress, egress or bidirectional), priority, action (e.g., pass packet, drop packet, push to user space for advanced processing), filters (e.g., L2, L3, L4, metadata, process name), and tunneling (e.g., destination information and type of tunnel encapsulation, such as VXLAN or GRE). An example of a traffic monitoring policy is to tap traffic from a discovered service that has three pods, and filter that traffic to allow only traffic to destination TCP port 80.

Encryption-Compatible Visibility (ECV)

As mentioned above, ECV is a technique introduced here, for providing clear text representing monitored data that is encrypted or about to be encrypted, from a worker node to one or more other entities, such as one or more TVNs and/or tools, that expect to receive the data as clear text. The technique avoids the need for resource intensive key management for purposes of providing visibility for encrypted network traffic. In the embodiment of FIG. 5, by using the user interface of TVMS 524, the user can specify where ECV is to be applied in the containerized environment. In other words, the user can specify, for example, which encrypted data traffic is to be converted to clear text and provided to the TVN 502 (for subsequent routing to one or more of the tools 512). For example, the user can specify one or more particular services whose traffic is to be converted to clear text and provided to the TVN 502. This information may be stored in policies database 538, for example.

Figure 6:
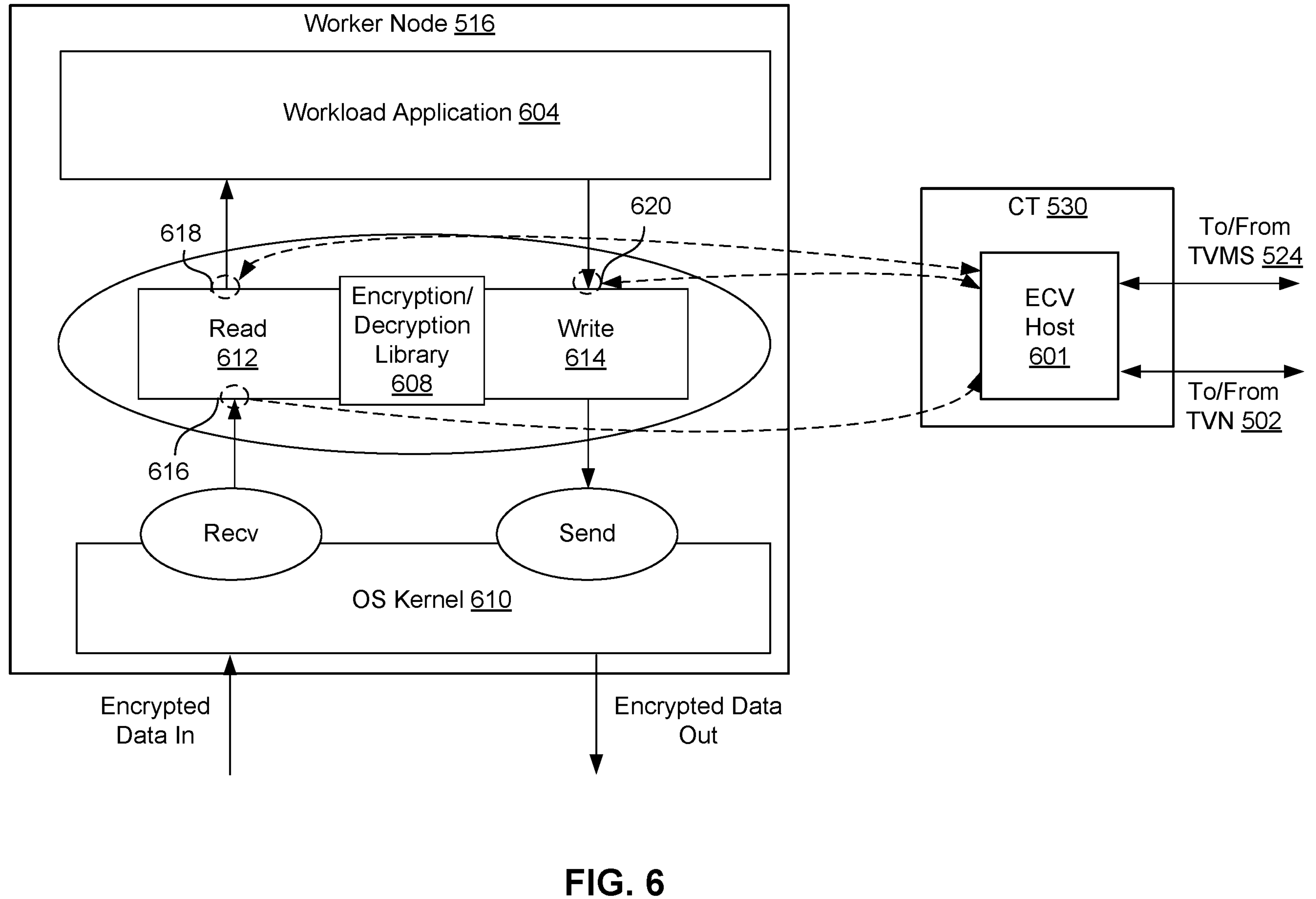
FIG. 6 schematically illustrates the components of, and functional relationships between, a worker node and a corresponding encryption-compatible visibility (ECV) host.

The TVMS 524 includes an ECV management module (EMM) 544 that uses the specified service(s) specified by the user to look up the corresponding workload application (s) that provide the service(s), and the worker node(s) in which the identified workload application(s) is/are implemented. In some embodiments, as shown in FIG. 6, each worker node 516 has a dedicated ECV host 601 associated with it. In response to the user's selection of services to which to apply ECV, the TVMS 524 sends a ECV request signal identifying the corresponding workload applications to the dedicated ECV host 601 associated with each worker node 516 that hosts an instance of the corresponding workload applications. In some embodiments, a workload application 604 may be a TLS-enabled application ("TLS application"). In some embodiments, a dedicated ECV host 601 may be instantiated for each worker node 516 upon initialization of the containerized environment. In other embodiments, the dedicated ECV host 601 may be instantiated for a given worker node dynamically during runtime, on an as needed basis, for example, when the TVMS 524 determines that ECV is needed at the given worker node.

Note that while the ECV technique is described herein in the context of a containerized environment for convenience, the ECV technique can also be implemented in a non-containerized environment. In a non-containerized embodiment, the worker node in FIG. 6 may be a virtual machine, for example.

In some embodiments, as shown in FIG. 6, each dedicated ECV host 601 may be included in the CT 530 associated with its worker node 516. To facilitate description of the ECV technique, this description henceforth is based on such an embodiment, except where stated otherwise. Note, however, that other embodiments are contemplated, in which the dedicated ECV host 601 may be implemented in another component, or as a standalone entity. In at least some embodiments, the EMM 544 and/or the dedicated ECV host 601 are each implemented as programmable circuitry, programmed by instructions to execute the functions described herein as being performed by these entities. Such programmable circuitry may include, for example, one or more conventional programmable general-purpose or special-purpose microprocessors and/or microcontrollers. In other embodiments, the EMM 544 and/or the dedicated ECV host 601 each may be implemented using preconfigured or hardwired circuitry, such as one or more application specific integrated circuits (ASICs), programmable logic devices (PLD), or the like. In still other embodiments, the dedicated ECV host 601 may be implemented using a combination of programmable circuitry and hardwired circuitry.

Referring to FIG. 6, ECV may be requested for encrypted data received by the worker node 516 (i.e., "Encrypted Data In"). That event may be signaled to the ECV host 601 by the EMM 544. In that case, and assuming SSL is the relevant encryption/decryption protocol, the ECV host 601 responds by applying software hooks to the entry point 618 and exit point 618 of the Read function 612 in the encryption library 608 of the worker node 516. The Read function 612 may be, for example, an SSL_Read function, and the encryption/decryption library 608 may be, for example, an OpenSSL library, as henceforth assumed herein for the sake of facilitating description. The software hooks may be, for example, eBPF trace point hooks, and more specifically, eBPF uprobe hooks. The software hook can be implemented in code that is part of the eBPF kernel 622, which can be loaded into the OS kernel 610 by the ECV host 601. The software hook can be applied to the entry point 616 of the Read function 612 detects a call by the operating system (OS) kernel 610 to the Read function 612 in response to receipt of each encrypted packet by the worker node from outside the worker node (the OS kernel 610 can be, for example, a Linux kernel). This call is used to trigger capture of the packet payload in clear text at the exit point 618 of the Read function. In response to that trigger, the software hook on the exit point 618 of the Read function actually captures the packet payload in clear text and provides it to the ECV host 601. In at least some embodiments, eBPF maps are used to pass the clear text payload data from the OS kernel space to user space when the software hook is hit.

ECV may additionally or alternatively be applied to data that is generated by the workload application for transmission in encrypted form by the worker node to another node. That event is signaled to the ECV host 601 by the TVMS 524. In that case, the ECV host 601 responds by applying a software hook to the entry point 620 of the Write function 614 in the encryption/decryption library 608 of the worker node 516. The write function 614 may be, for example, an SSL_Write function, as henceforth assumed herein for the sake of facilitating description. This software hook detects a call to the Write function by the workload application 604 when the workload application 604 passes a clear text packet payload to the Write function. This call is used both to trigger the capture and to perform the capture of the clear text payload of each unencrypted packet generated by the workload application directly from the entry point 620 of the Write function, before the packet payload is encrypted by the SSL library. In at least one embodiment, the hook is also an eBPF uprobe hook. Another software hook (which can also be an eBPF uprobe hook, for example) can be placed at the exit point of the Write function to enable the ECV host 601 to ascertain the actual amount of data that was written via the SSL_write.

Whenever the ECV host 601 receives a clear text packet payload from its associated worker node 516 in the above-described situations (e.g., via the above-mentioned hooks), it places the clear text packet payload into a buffer. In some embodiments the buffer is an eBPF perf buffer. The ECV host 601 then forms a modified packet by synthesizing the L2, L3 and L4 headers for the packet payload and appending the synthesized headers to the clear text packet payload. To synthesize the headers, in some embodiments, whenever SSL_accept/SSL_connect is invoked by the workload application 604, an SSL_HELLO message will be triggered. This message can be captured using an eBPF kprobe hook placed against the function, tcp_sendmsg (a Linux kernel API). L3 and L4 header information is then fetched via this hook by accessing the socket structures at the kprobe level. For L2 header information, the source MAC address can be fetched for all of the interfaces at the time of adding the uprobes and stored, and then can be used as L2 Source MAC address while framing the TCP/IP frame. The MAC address of the default gateway can be used as the L2 Destination MAC address.

After synthesizing the headers, the ECV host 601 then sends the modified packet to one or more other devices, such as the TVN 502 and/or one or more associated tools 512. In some embodiments, the ECV host 601 sends the modified packet to the TVN 502 and/or tools 512 via the tunnel 548. In some embodiments in which that is the case, the tunnel 548 may be secure tunnel.

In at least some embodiments, the ECV host 601 can perform ECV for multiple simultaneous connections between the worker node 516 and two or more other devices, while properly mapping the four-tuple (source IP address, destination IP address, source port number, destination port number) or five-tuple information to respective SSL_Read and SSL_Write. The ECV host 601 keeps track of each session (five-tuple) for which it is performing ECV. This way, it can forward only the ECV-processed packets that need to be forwarded. The five-tuple details are stored by the ECV host 601 on a per connection basis, identified by the SSL object and the thread that invoked the connection. The saving of this contextual metadata makes handling simultaneous connections possible.

Figure 7:
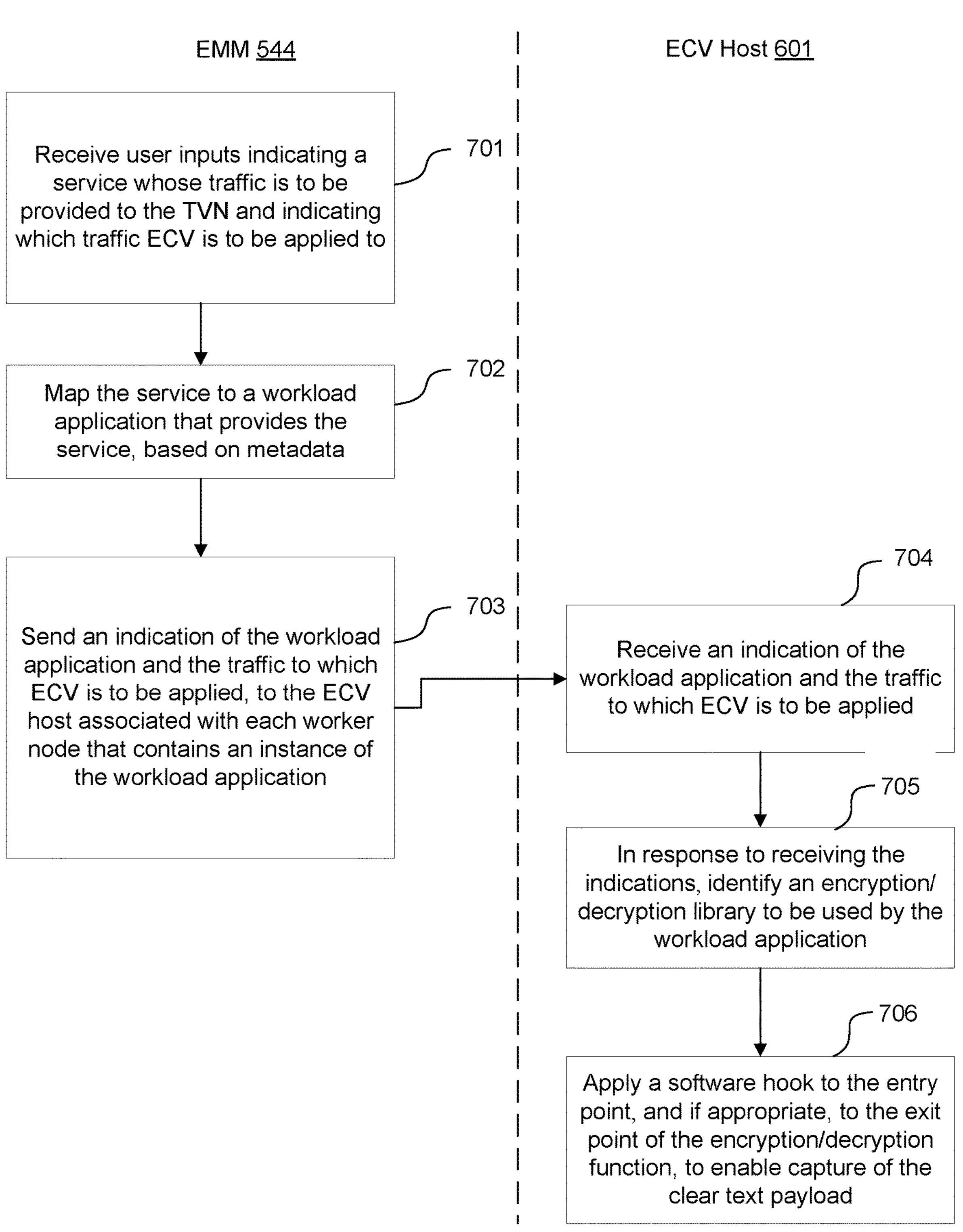
FIG. 7 is a flowchart illustrating an example of a process to configure the system to perform ECV.

FIG. 7 illustrates an example of a process to configure the system to perform ECV. In at least some embodiments the process is performed partly by the EMM 544 in the TVMS 524 and partly by one or more ECV hosts 601. At step 701 the EMM 544 receives user inputs indicating a service whose traffic is to be provided to the traffic visibility node and indicating which traffic ECV is to be applied to, i.e., received data, data to be transmitted, or both. In response to these user inputs, at step 702 the EMM 544 maps the service to a workload application that provides the service, based on metadata. For example, this step may use a portion of relationship data 540 (FIG. 5) to make this determination.

At step 703 the EMM 544 sends an indication of the workload application and the traffic to which ECV is to be applied, to the ECV host 601 associated with each worker node 516 that contains an instance of the relevant workload application.

Steps 704 through 706 may be performed by each such ECV host 601. At step 704 the ECV host 601 receives these above-mentioned indications. In response to receiving the indications, the ECV host 601 at step 705 identifies an encryption/decryption library to be used by the workload application (e.g., an SSL library), wherein the encryption/decryption library includes the encryption/decryption functionality to be applied to received or generated packets associated with the workload application. At step 706 the ECV host 601 applies a software hook to the entry point, and if appropriate, to the exit point of the encryption/decryption function, to enable capture of the clear text payload. To apply ECV to data received by the worker node, a first software hook is applied to the exit point of the decryption function to capture the clear text data, and a second software hook is applied to the entry point of the decryption function to trigger this action when a packet is received. The encrypted version of the packet can be captured by placing a third hook at the level of the virtual network interface in the worker node for the user pod, to enable the encrypted data and corresponding clear text data to be sent to the TVN 502 or other devices in a correlated manner. On the other hand, to apply ECV to data to be generated by the worker node, a software hook at the entry point of the encryption function captures the clear text data.

Figure 8:
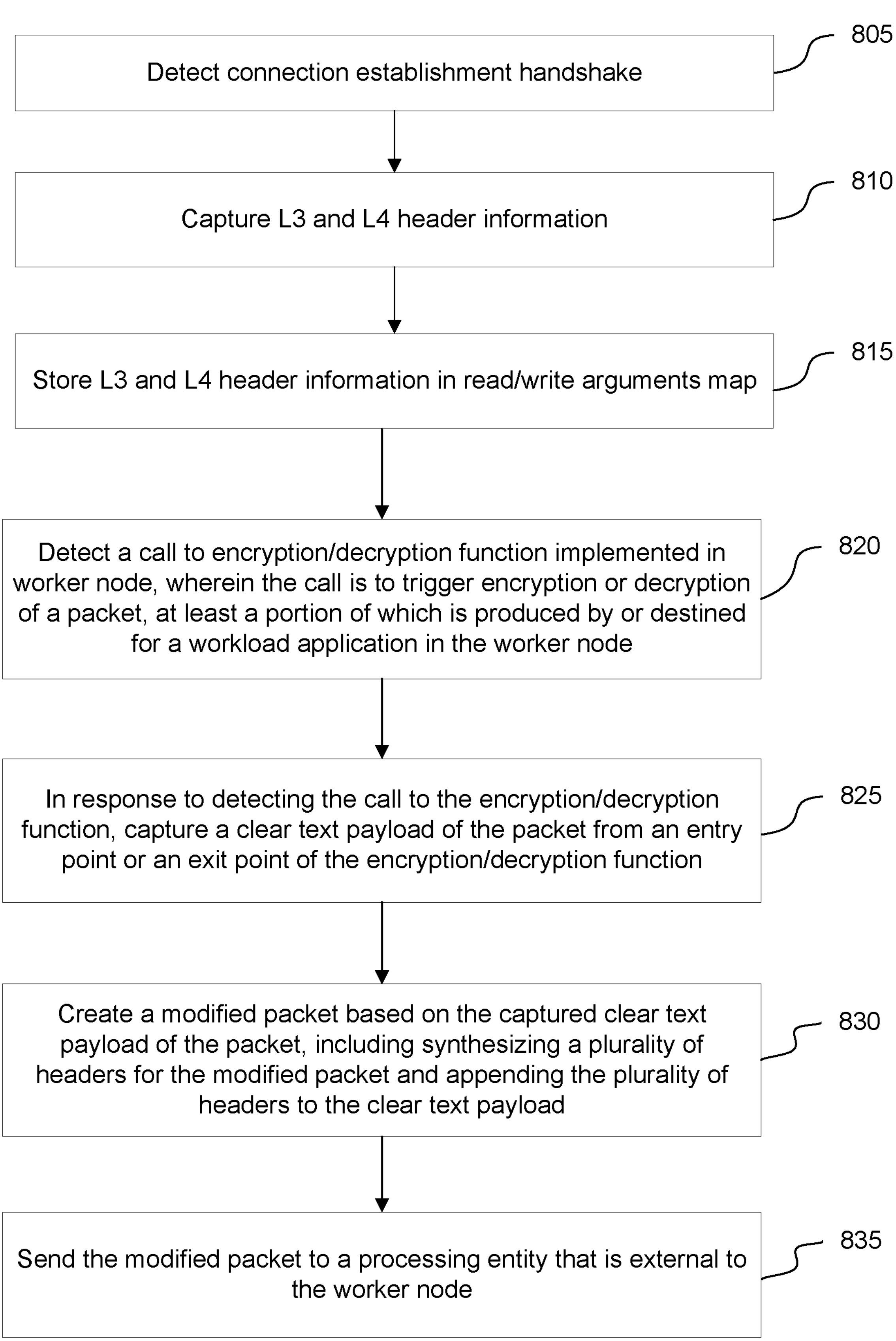
FIG. 8 is a flowchart illustrating an example of the runtime ECV process associated with a given worker node.

FIG. 8 is a flowchart of an example of the runtime ECV process associated with a given worker node. Initially, when the OS kernel 610 (FIG. 6) detects a handshake for establishing an encrypted connection (e.g., SSL_connect/SSL_accept messages) at step 805, the eBPF kernel 622 responds by capturing the L3 and L4 header information of the handshake messages at step 810, which may be done by using an eBPF Kprobe, for example. The eBPF kernel 622 then associates that header information with the connection pointer (e.g., SSL pointer) in a read/write arguments map at step 815. The purpose of the read/write arguments map is to provide a way to store and access (via the connection pointer) the clear-text data before the data is encrypted or after the data is decrypted. The connection pointer may be obtained via SSL_connect( )/SSL_accept( ) hooks, for example.

At step 820, the ECV host 601 detects a call to an encryption/decryption function implemented in its associated worker node. The call is to trigger encryption or decryption of a packet, at least a portion of which is produced by or destined for a workload application in the worker node. The call may be detected via an eBPF uprobe hook, for example. At step 825, in response to detecting the call, the process captures a clear text payload of the packet from the entry point or the exit point of the encryption/decryption function. In the case where the call is to an encryption function, the clear text payload is captured from the entry point of the function. In the case where the call is to a decryption function, the clear text payload is captured from the exit point of the function.

The ECV host 601 runs a polling thread that polls on an eBPF perf event. In response to the polling thread detecting a perf event, the ECV host 601 generates and sends the modified packet. Hence, at step 830, the process of FIG. 8 creates a modified packet based on the captured clear text payload of the packet. Step 830 includes synthesizing a plurality of headers for the modified packet and appending the plurality of headers to the clear text payload, as described above. Optionally, the ECV host 601 also generates and appends a VxLAN or L2GRE header. At step 835, the process sends the modified packet to a processing entity that is external to the worker node, such as the TVN 501 and/or an associated tool 512.

Figure 9:
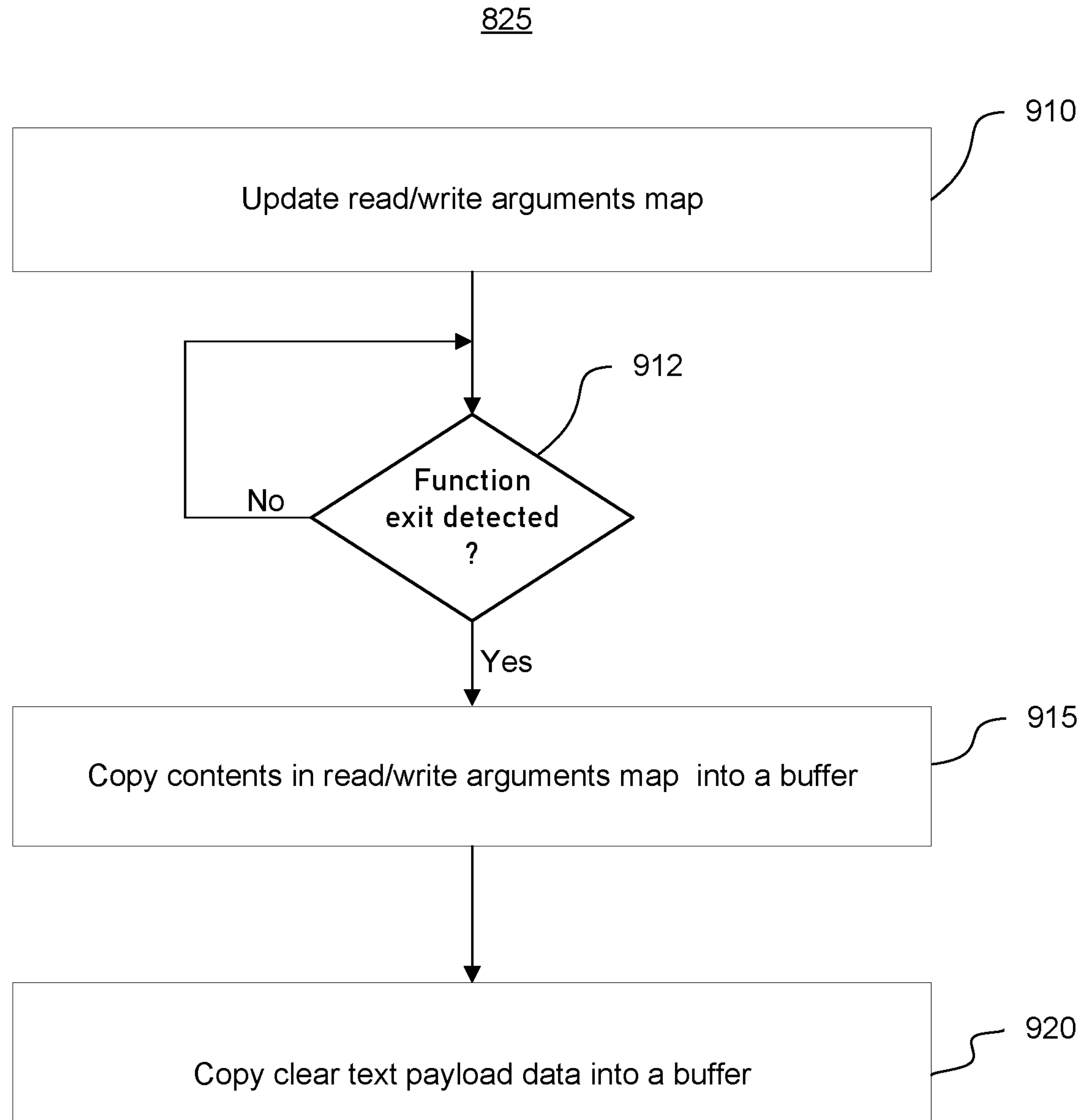
FIG. 9 is a flowchart illustrating in greater detail an example of the step of capturing clear text payload data.

FIG. 9 illustrates in greater detail the step 825 of capturing the clear text payload data, according to some embodiments. In at least some embodiments the process of step 825 is performed by the ECV host 601. When the ECV host 601 receives a call to the encryption/decryption function, step 815 includes, first, updating the read/write arguments map at step 910. Then, upon detecting an exit from the function (via another eBPF uprobe hook, for example) (step 912), at step 915 the process copies the clear-text data stored in the read/write map along with the SSL pointer and process information to a buffer, which may be a perf buffer. The size of the buffer may be configurable, where the size may be tuned to the memory available to the host system or virtual machine, in an effort to optimize performance. This configurability allows the solution to handle clear text of essentially any size. At step 920 the process submits the data in the buffer to a user space ECV application, which may be implemented by or a part of the ECV host 601.

Correlation of Clear-Text and Encrypted Traffic

Some external devices (e.g., tools 516) may require the original encrypted traffic to be provided with the clear text payloads. In at least some embodiments, therefore, the ECV host 601 can correlate clear text traffic with the corresponding encrypted traffic based on either flow or client and server random numbers at the tool. To do so, the ECV host 601 captures client and server random numbers from the SSL Client-Hello and Server-Hello messages, and captures five-tuple information (source IP address, source port, destination IP address, destination port, transport protocol), between the client and server. The ECV host 601 saves these items as correlation metadata and uses them to correlate the captured clear text payloads with the corresponding encrypted packets.

Service ID/Translation

In some embodiments, the ECV host 601 performs service identification/translation. In a containerized environment, such as Kubernetes, IP addresses are ephemeral, i.e., they only have meaning within the containerized cluster; yet the TVN 502 and tools 512 are typically not part of the containerized cluster. Consequently, in most (if not all) cases the IP addresses of packets captured by the ECV host 601 ordinarily could not be mapped to a service or application in any meaningful way. However, the ECV host 601 can intelligently map these ephemeral/internal IP addresses to services or applications they refer to by doing service translation. The service translation can be based on, for example, one or more Kubernetes (or other environment) Resources. For example, a Kubernetes Service Name can map to an application that can run in multiple pods, and an external/global IP address can be mapped to that Service Name. The Service Name, therefore, can be used to determine an external or global IP address, which can then be used to rewrite the IP header information to the external/global IP address when creating a modified packet as described above. This translation allows components (e.g., TVN 502 and/or tools 512) running outside of the containerized environment to easily map the external/global address as it sees fit. Additionally, which Resource or a set of Resources should be used for service translation can be selectable and can be changed at any time, while normal data traffic is being communicated.

Advanced Orchestration and Configuration

In at least some embodiments the ECV technique also includes the capability to have multiple destinations for receiving clear traffic. Based on applications or services to which ECV is being applied, the ECV host 601 can dynamically determine which library's path should be used for placing the software hooks. The ECV technique is agnostic to the underlying container run-time environment for this determination. The ECV technique further may include the capability to be very selective in which traffic should be captured in the clear. This could be based upon application, services and/or any other criteria the user prefers, in addition to or instead of the traditional L2, L3 and L4 fields.

ECV High-Availability (ECV-HA)

The ECV technique can also be applied so as to provide ECV high-availability (ECV-HA). SSL clear text, once captured, can be securely transmitted over separate connections (e.g., SSL/TSL connections) from the ECV host 601 to each of one or more TVNs and/or tools (collectively called "ECV receivers"). However, if any ECV receiver goes offline and subsequently comes back online, the corresponding connection will need to be restored. During this recovery process, monitored data captured by the ECV host 601 may be lost. To prevent such loss, a load balancer can be added between the ECV host 601 and the ECV receivers. This addition would provide high availability for the ECV receivers and secure the transmission of monitoring data. A separate connection can be established between each ECV host 601 and the load balancer.

Dynamic Updating of Encryption/Decryption Libraries

In at least some embodiments, the ECV technique supports dynamic updating of encryption/decryption libraries (e.g., OpenSSL libraries). In the event a new library is installed after the ECV is enabled, the TVMS 524 will be able to detect the new changes and signal the relevant ECV host 601 to dynamically add software hooks for the new library.

Example Physical Implementation

Figure 10:
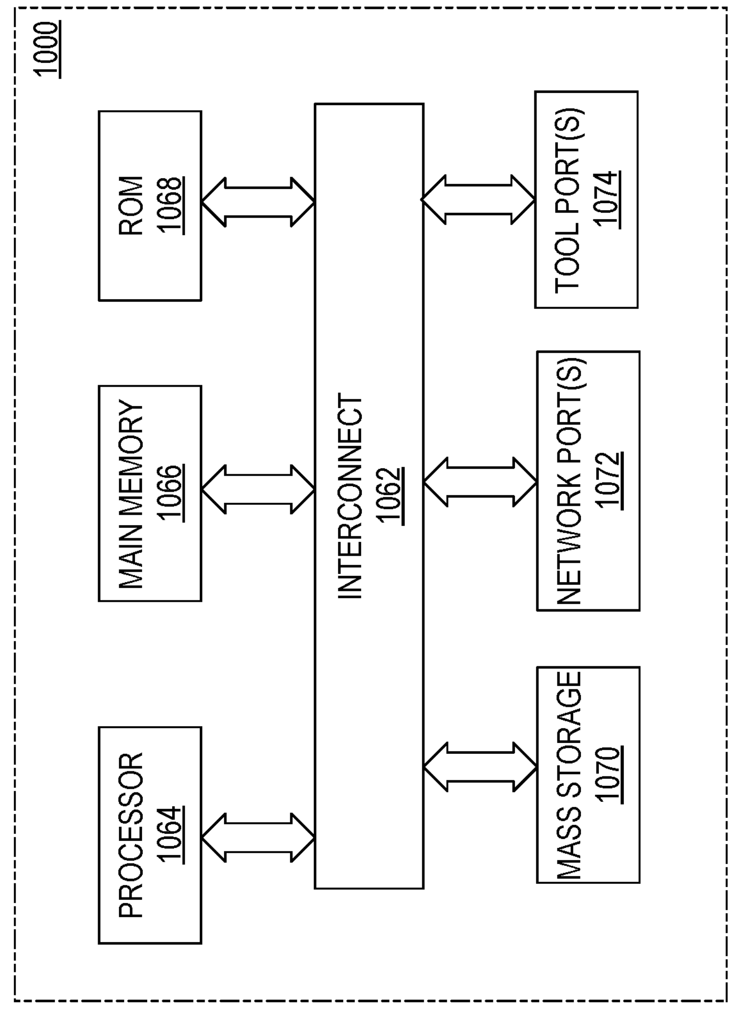
FIG. 10 is a block diagram of significant components of a processing system, representing a physical platform that can implement one or more of the components described herein.

FIG. 10 is a block diagram showing at least some of the significant components of a processing system 1000, representing a physical platform that can implement any one or more of: a worker node (or multiple worker nodes) 516, TVMS 524, TVN 502, tool 512 and/or other elements of a containerized environment. As shown, processing system 1000 includes an interconnect 1062 or other communication mechanism for communicating information, and at least one processor 1064 coupled with the interconnect 1062 for processing information. The interconnect 1062 may be or include, for example, one or more buses, adapters, point-to-point connections, or a combination thereof.

The processor 1064 may be used to perform various functions described above. For example, in some embodiments the processor 1064 may perform and/or trigger encryption and decryption operations, inspect packet headers, generate, store and compare hash values/session IDs, etc. The processor 1064 can be implemented as programmable circuitry programmed/configured by software and/or firmware, or as special-purpose (hardwired) circuitry, or by a combination thereof. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

The processing system 1000 also includes a main memory 1066, such as a random access memory (RAM) or other dynamic storage device, coupled to the interconnect 1062 for storing information and instructions to be executed by the processor 1064. The main memory 1066 also may be used for storing temporary variables or other intermediate information during execution of instructions to be executed by the processor 1064. The processing system 1000 further includes a read only memory (ROM) 1068 or other static storage device coupled to the interconnect 1062 for storing static information and instructions for the processor 1064. A mass storage device 1070, such as a magnetic, solid-state or optical disk, is coupled to the interconnect 1062 for storing information and instructions. The processing system 1000 further includes one or more physical network ports 1072 coupled to the interconnect 1062, through which the processing system 1000 can communicate over one or more networks with one or more external devices. At least in a case where processing system 1000 is a TVN, processing system 1000 further includes one or more physical tool ports 1074 coupled to the interconnect 1062, through which the processing system 1000 can communicate with a corresponding one or more tools.

The processing system 1000 may be used for performing various functions described above. According to one embodiment, such use is provided by system 1000 in response to processor 1064 executing one or more sequences of one or more instructions contained in the main memory 1066. Such instructions may be read into the main memory 1066 from another computer-readable medium, such as storage device 1070. Execution of the sequences of instructions contained in the main memory 1066 causes the processor 1064 to perform the process steps described herein. One or more processors in a multi-processing arrangement may also be employed to execute the sequences of instructions contained in the main memory 1066. In alternative embodiments, hard-wired circuitry may be used in place of or in combination with software instructions to implement features of the embodiments described herein. Thus, embodiments described herein are not limited to any specific combination of hardware circuitry and software.

Unless contrary to physical possibility, it is envisioned that (i) the methods/steps described herein may be performed in any sequence and/or in any combination, and that (ii) the components of respective embodiments may be combined in any manner.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, tablet computer, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:

for each of a plurality of packets, where each packet is associated with a different one of a plurality of connections, storing, in a data structure in a memory, contextual metadata for the packet and a connection pointer in association with the contextual metadata, the connection pointer corresponding to a security protocol;

detecting a call to an encryption/decryption function implemented in a worker node, wherein the call is to trigger encryption or decryption of a packet, at least a portion of which is produced by or destined for a workload application in the worker node;

in response to detecting the call to the encryption/decryption function, capturing a clear text payload of the packet from an entry point or an exit point of the encryption/decryption function, creating a modified packet based on the captured clear text payload of the packet, including synthesizing a plurality of headers for the modified packet and appending the plurality of headers to the clear text payload, and wherein creating the modified packet further includes identifying the contextual metadata for the packet, using the contextual metadata to identify the connection pointer in the data structure, and thereby identifying a connection with which the packet is associated, wherein the stored contextual metadata is indicative of a mapping between the modified packet and an encrypted packet corresponding to the modified packet within a session of the security protocol, and based on the identifying the connection with which the packet is associated, including additional metadata in at least one of the synthesized headers to indicate the connection with which the packet is associated; and sending the modified packet to a processing entity that is external to the worker node.

2. The method of claim 1, wherein detecting the call to the encryption/decryption function is accomplished by use of a software hook applied at the entry point of the encryption/decryption function.

3. The method of claim 1, wherein the encryption/decryption function is a decryption function, and the capturing of the clear text payload of the packet is accomplished by use of a software hook applied at the exit point of the decryption function.

4. The method of claim 1, wherein the encryption/decryption function is an encryption function, and the capturing of the clear text payload of the packet is accomplished by use of a software hook applied at the entry point of the encryption function.

5. The method of claim 1, wherein synthesizing the plurality of headers for the modified packet comprises synthesizing L2, L3 and L4 headers for the modified packet.

6. The method of claim 1, wherein the workload application is a transport layer security (TLS) application, and the encryption/decryption function is part of a secure sockets layer (SSL) library.

7. The method of claim 1, wherein the processing entity that is external to the worker node is a traffic visibility node.

8. The method of claim 7, wherein sending the modified packet to the processing entity that is external to the worker node comprises using a tunneling protocol to send the modified packet to the traffic visibility node.

9. The method of claim 1, wherein the worker node is a worker node of a containerized environment or a virtual machine.

10. The method of claim 1, wherein the contextual metadata comprises a packet sequence number and packet header information.

11. The method of claim 1, further comprising:

in response to detecting the call to the encryption/decryption function, capturing the packet in encrypted form by using a software hook placed at an interface level;

correlating the packet in encrypted form with the modified packet based on the mapping; and sending the packet in encrypted form to the processing entity that is external to the worker node in association with the modified packet, wherein the sending the packet includes sending information, based on the correlating, associating the modified packet and the packet in encrypted form.

12. The method of claim 1, wherein the worker node operates within a cluster, and wherein the processing entity that is external to the worker node operates outside the cluster.

13. The method of claim 12, wherein the packet contains a first network address that is applicable only within the cluster;

the method further comprising, prior to sending the modified packet to the processing entity that is external to the worker node, mapping the first network address to a second network address that is applicable outside the cluster; and substituting the second network address for the first network address when creating the modified packet.

14. The method of claim 1, wherein the processing entity that is external to the worker node is a traffic visibility node, the method further comprising:

receiving user input indicating a service whose traffic is to be provided to the traffic visibility node; and in response to the user input, mapping the service to the workload application in the worker node, based on metadata; and sending an indication of the workload application to a programmatic entity associated with the worker node.

15. The method of claim 14, further comprising, by the programmatic entity associated with the worker node:

receiving the indication of the workload application; and in response to the indication of the workload application, identifying an encryption/decryption library to be used by the workload application, wherein the encryption/decryption library includes the encryption/decryption function, and applying a software hook to the entry point or the exit point of the encryption/decryption function, to enable capture of the clear text payload.

16. At least one machine-readable storage device having instructions stored thereon, execution of which by at least one processor causes performance of operations comprising:

for each of a plurality of packets, where each packet is associated with a different one of a plurality of connections, storing, in a data structure in a memory, contextual metadata for the packet and a connection pointer in association with the contextual metadata, the connection pointer corresponding to a security protocol;

detecting a call to an encryption/decryption function implemented in a worker node, wherein the call is to trigger encryption or decryption of a packet, at least a portion of which is produced by or destined for a workload application in the worker node; and in response to detecting the call to the encryption/decryption function, capturing a clear text payload of the packet from an entry point or an exit point of the encryption/decryption function, creating a modified packet based on the captured clear text payload of the packet, including synthesizing a plurality of headers for the modified packet and appending the plurality of headers to the clear text payload, and wherein creating the modified packet further includes identifying the contextual metadata for the packet, using the contextual metadata to identify the connection pointer in the data structure, and thereby identifying a connection with which the packet is associated, and based on the identifying the connection with which the packet is associated, including additional metadata in at least one of the synthesized headers to indicate the connection with which the packet is associated, wherein the stored contextual metadata is indicative of a mapping between the modified packet and an encrypted packet corresponding to the modified packet within a session of the security protocol; and sending the modified packet to a processing entity that is external to the worker node.

17. The at least one machine-readable storage device of claim 16, wherein the encryption/decryption function is a decryption function, and the capturing of the clear text payload of the packet is accomplished by use of a software hook applied at the exit point of the decryption function.

18. The at least one machine-readable storage device of claim 16, wherein the encryption/decryption function is an encryption function, and the capturing of the clear text payload of the packet is accomplished by use of a software hook applied at the entry point of the encryption function.

19. The at least one machine-readable storage device of claim 16, wherein synthesizing the plurality of headers for the modified packet comprises synthesizing L2, L3 and L4 headers for the modified packet.

20. A computer system comprising:

a memory;

a network interface;

a processor coupled to the memory and the network interface and configured to perform operations comprising, for each of a plurality of packets, where each packet is associated with a different one of a plurality of connections:

storing, in a data structure in a memory, contextual metadata for the packet and a connection pointer in association with the contextual metadata, the connection pointer corresponding to a security protocol;

detecting a call to an encryption/decryption function implemented in a worker node, wherein the call is to trigger encryption or decryption of a packet, at least a portion of which is produced by or destined for a workload application in the worker node; and in response to detecting the call to the encryption/decryption function, capturing a clear text payload of the packet from an entry point or an exit point of the encryption/decryption function, creating a modified packet based on the captured clear text payload of the packet, including synthesizing a plurality of headers for the modified packet and appending the plurality of headers to the clear text payload, and wherein creating the modified packet further includes identifying the contextual metadata for the packet, using the contextual metadata to identify the connection pointer in the data structure, and thereby identifying a connection with which the packet is associated, wherein the stored contextual metadata is indicative of a mapping between the modified packet and an encrypted packet corresponding to the modified packet within a session of the security protocol, and based on the identifying the connection with which the packet is associated, including additional metadata in at least one of the synthesized headers to indicate the connection with which the packet is associated; and sending the modified packet to a processing entity that is external to the worker node.

21. The computer system of claim 20, wherein the encryption/decryption function is a decryption function, and the capturing of the clear text payload of the packet is accomplished by use of a software hook applied at the exit point of the decryption function.

22. The computer system of claim 20, wherein the encryption/decryption function is an encryption function, and the capturing of the clear text payload of the packet is accomplished by use of a software hook applied at the entry point of the encryption function.

23. The computer system of claim 20, wherein synthesizing the plurality of headers for the modified packet comprises synthesizing L2, L3 and L4 headers for the modified packet.

* * * * *